(12) United States Patent
Sharma et al.

(10) Patent No.: US 11,576,056 B1
(45) Date of Patent: Feb. 7, 2023

(54) UNIFIED DATA REPOSITORY (UDR) MESSAGING IN A WIRELESS COMMUNICATION NETWORK

(71) Applicant: T-Mobile Innovations LLC, Overland Park, KS (US)

(72) Inventors: Anuj Sharma, Broadlands, VA (US); Anil Kumar Mariyani, Ashburn, VA (US); Rajil Malhotra, Olathe, KS (US); Deepesh Belwal, Ashburn, VA (US); Dipta Moy Biswas, Bothell, WA (US); Sriharsha Nagaraja Kadalbal, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 1 day.

(21) Appl. No.: 17/316,359

(22) Filed: May 10, 2021

(51) Int. Cl.
| | |
|---|---|
| *H04L 12/54* | (2022.01) |
| *H04W 24/08* | (2009.01) |
| *H04W 24/02* | (2009.01) |
| *H04L 49/90* | (2022.01) |
| *H04L 12/46* | (2006.01) |
| *H04W 28/02* | (2009.01) |

(52) U.S. Cl.
CPC ......... *H04W 24/02* (2013.01); *H04L 12/4641* (2013.01); *H04L 49/90* (2013.01); *H04W 28/0268* (2013.01)

(58) Field of Classification Search
CPC .............. H04W 24/02; H04W 28/0268; H04L 12/4641; H04L 49/20
See application file for complete search history.

(56) References Cited

U.S. PATENT DOCUMENTS

| | | | |
|---|---|---|---|
| 8,457,056 B2 | 6/2013 | Zhang et al. | |
| 8,898,448 B2 | 11/2014 | Klingenbrunn et al. | |
| 9,942,925 B2 | 4/2018 | Merlin et al. | |
| 10,630,501 B2 | 4/2020 | Ansari et al. | |
| 2008/0008203 A1* | 1/2008 | Frankkila | H04W 72/1242 370/428 |
| 2011/0103395 A1 | 5/2011 | Ratnakar et al. | |

(Continued)

FOREIGN PATENT DOCUMENTS

| | | |
|---|---|---|
| WO | 2013086362 A1 | 6/2013 |
| WO | 2017039912 A1 | 3/2017 |

*Primary Examiner* — Derrick V Rose

(57) ABSTRACT

In a wireless communication network, a Unified Data Repository (UDR) is served by a UDR Message Function (UMF). The UMF receives a UDR message that relates to a User Equipment (UE) for delivery to a network function. The UMF writes the current UDR message to a UDR message queue for the UE. The UMF determines when the UDR message queue stores multiple UDR messages that relate to the UE. When the current UDR message is the only message in the message queue for the UE, the UMF transfers the current UDR message to the destination network function. When the message queue for the UE stores multiple UDR messages for the UE, the UMF stops message transfer from the queue and prioritizes the UDR messages in the message queue. The UMF restarts message transfer from the queue and transfers the UDR messages to the network functions based on the prioritization. The UDR message queue stores the UDR messages under control of the UMF.

20 Claims, 8 Drawing Sheets

(56) References Cited

U.S. PATENT DOCUMENTS

| | | | | |
|---|---|---|---|---|
| 2013/0195108 A1* | 8/2013 | Hu | ............................ | H04L 69/16 |
| | | | | 370/392 |
| 2019/0045421 A1* | 2/2019 | Shah | ...................... | H04W 40/02 |
| 2022/0190886 A1* | 6/2022 | Islam | .................... | H04B 7/0417 |

* cited by examiner

UNIFIED DATA REPOSITORY (UDR) MESSAGING IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), Policy Control Functions (PCFs), Unified Data Repositories (UDRs), Unified Data Management (UDM), Network Exposure Functions (NEFs), and the like.

A UDR may be coupled to a network operations system that issues network instructions. For example, the network operations system may direct the UDR to improve a data rate for a wireless user device that qualifies for a premium service. In another example, the network operations system may direct the UDR to stop service for another wireless user device that has exceeded a service limit. The UDR generates and transfers network signaling based on these network instructions. The UDR may direct a PCF to modify service quality for a wireless user device. The UDR may direct a UDM to stop service for another wireless user device. The UDR performs other tasks in a similar manner.

The UDR has direct access to the UDM, PCF, and NEF in its Public Land Mobile Network (PLMN). The UDR does not effectively transfer the signaling messages to the UDM, PCF, NEF, or other network elements. Moreover, the UDR fails to efficiently prioritize and deliver signaling messages. Unfortunately, the UDR holds important signaling messages awaiting transmission and delays important network operations.

TECHNICAL OVERVIEW

In a wireless communication network, a Unified Data Repository (UDR) is served by a UDR Message Function (UMF). The UMF receives a UDR message that relates to a User Equipment (UE) for delivery to a network function. The UMF writes the current UDR message to a UDR message queue for the UE and determines when the UDR message queue stores multiple UDR messages that relate to the UE. When the current UDR message is the only message in the queue, the UMF transfers the current UDR message to the destination network function. When the message queue for the UE stores multiple UDR messages for the UE, the UMF stops message transfer from the queue and prioritizes the UDR messages in the queue. The UMF restarts message transfer from the queue and transfers the UDR messages to the network functions based on the prioritization. The UDR message queue stores the UDR messages under control of the UMF.

DETAILED DESCRIPTION

Figure 1:
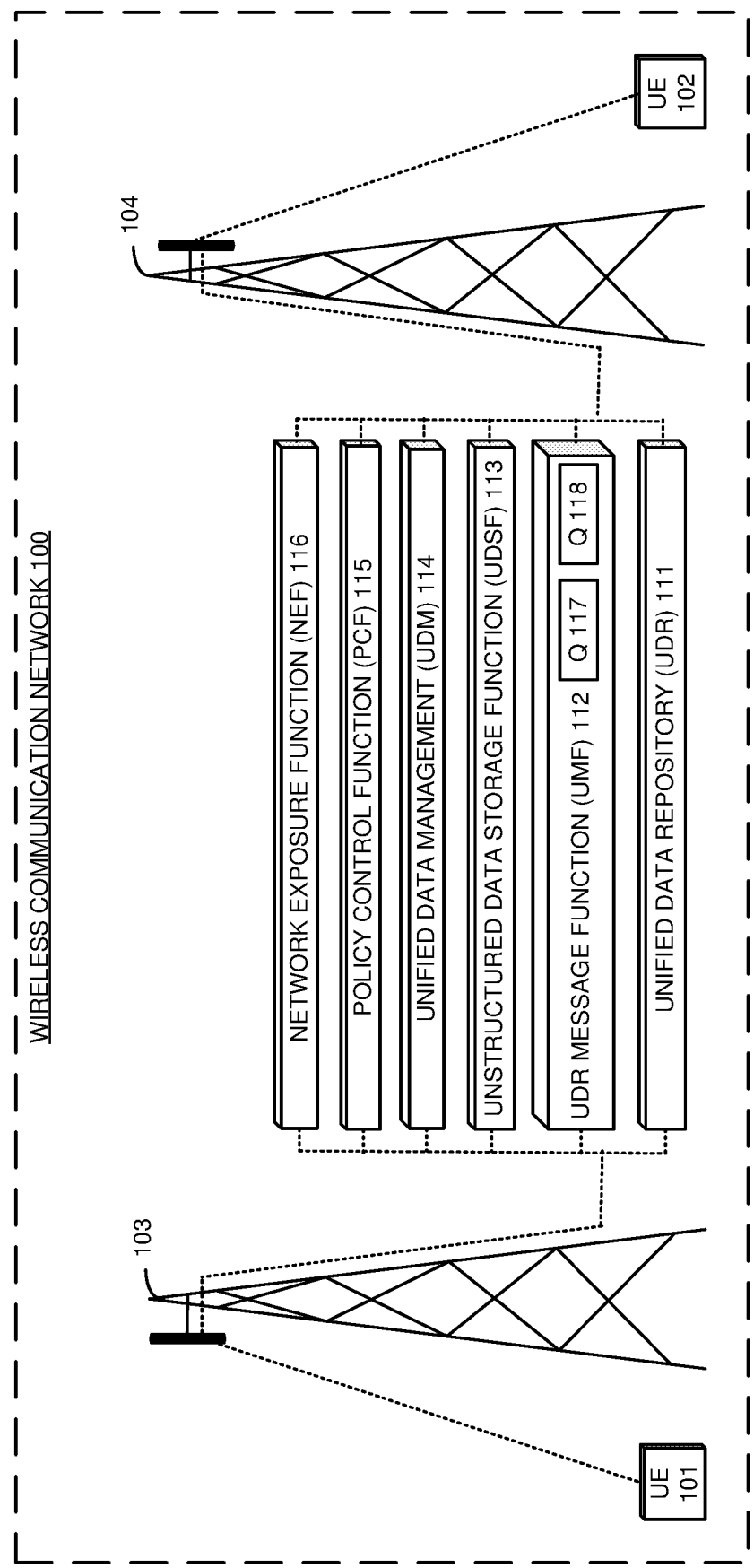
FIG. 1 illustrates a wireless communication network that serves a Unified Data Repository (UDR) over a UDR Messaging Function (UMF).

FIG. 1 illustrates wireless communication network 100 that serves Unified Data Repository (UDR) 111 over UDR Message Function (UMF) 112. Wireless communication network 100 delivers wireless data services to UEs 101-102 like internet-access, machine-control, media-streaming, or some other data communications product. UEs 101-102 comprise computers, phones, vehicles, sensors, robots, or some other data appliances with wireless communication circuitry. Wireless communication network 100 comprises UEs 101-102, Radio Access Networks (RANs) 103-104, Unified Data Repository (UDR) 111, UDR Message Function (UMF) 112, Unstructured Data Storage Function (UDSF) 113, Unified Data Management (UDM) 114, Policy Control Function (PCF) 115, and Network Exposure Function (NEF) 116. UMF 112 comprises UDR message queue (Q) 117 for UE 101 and UDR message queue 118 for UE 102. Additional network functions like Access and Mobility Management Function (AMF) and User Plane Function (UPF) are typically present but are omitted for clarity. Wireless communication network 100 is simplified and typically includes more UEs and RANs than shown.

Various examples of network operation and configuration are described herein. In some examples, UDR 111 transfer a UDR message to UMF 112 that relates to wireless UE 101 and is for delivery to UDSF 113, UDM 114, PCF 115, NEF 116, or some other network function. UMF 112 writes the UDR message to UDR message queue 117 for the wireless UE 101. UDR message queue 117 for the wireless UE 101 stores the UDR message and may store other UDR messages that relate to UE 101. UFM 112 determines if UDR message queue 117 for UE 101 stores any other UDR messages. When UDR message queue 117 for UE 101 does not store any other UDR messages, UMF 112 transfers the UDR message that relates to wireless UE 101 from message queue 117 for delivery to one of network functions 113-116 (UDSF 113, UDM 114, PCF 115, NEF 116) or to some other destination. When UDR message queue 117 for wireless UE 101 stores other UDR messages, UMF 112 locks UDR message queue 117 for the wireless UE 101 by stopping all message transfers from queue 117. UFM 112 prioritizes the UDR messages in UDR message queue 117 for UE 101 based on message age, type, destination, and/or some other factors. UFM 112 then unlocks UDR message queue 117 for UE 101 by restarting message transfer. UFM 112 now transfers the UDR messages that relate to wireless UE 101 from UDR message queue 117 for delivery the network functions based on the prioritization. UFM 112 may use a protocol to assure UDR message delivery that typically employs receipt acknowledgements and repeat transmissions. The repeat UDR messages are placed in queues 117-119 and may be prioritized (and possibly deleted) before retransmission. Advantageously, UFM 112 effectively transfers signaling messages from UDR 111 to UDM 114, PCF 115, NEF 116, and possibly other network elements. Moreover, UFM 112 efficiently prioritizes signaling messages per UE to optimize the delivery of the more important signaling messages.

UDR message queues 117-118 each comprise a computer memory that stores data messages in an ordered manner and allows computer equipment to read and write the data messages from and to the memory. UDR message queues 117-118 may each be geographically diverse and comprise different physical storage units at geographically-diverse physical locations. UMF 112 and/or queues 117-118 might be integrated within UDR 111 and/or USDF 113. UMF 112 and/or queues 117-118 may comprise one or more Virtual Network Functions (VNFs) in a Network Function Virtualization Infrastructure (NFVI).

UEs 101 communicate with RANs 103-104 over technologies like Fifth Generation New Radio (5GNR), Long Term Evolution (LTE), Institute of Electrical and Electronic Engineers (IEEE) 802.11 (WIFI), LP-WAN, or some other wireless protocol. The wireless communication technologies use electromagnetic frequencies in the low-band, mid-band, high-band, or some other portion of the electromagnetic spectrum. Wireless communication system 100 is interconnected over data links that use metallic wiring, glass fibers, radio channels, or some other communication media. The data links use Institute of Electrical and Electronic Engineers (IEEE) 802.3 (Ethernet), Time Division Multiplex (TDM), Data Over Cable System Interface Specification (DOCSIS), WIFI, Internet Protocol (IP), General Packet Radio Service Transfer Protocol (GTP), 5GNR, LTE, WIFI, virtual switching, inter-processor communication, bus interfaces, and/or some other data communication protocols.

UEs 101-102 and RANs 103-104 comprise antennas, amplifiers, filters, modulation, analog/digital interfaces, microprocessors, software, memories, transceivers, bus circuitry, and the like. UDR 111, UFM 112, UDSF 113, UDM 114, PCF 115, NEF 116, and queues 117-118 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

Figure 2:
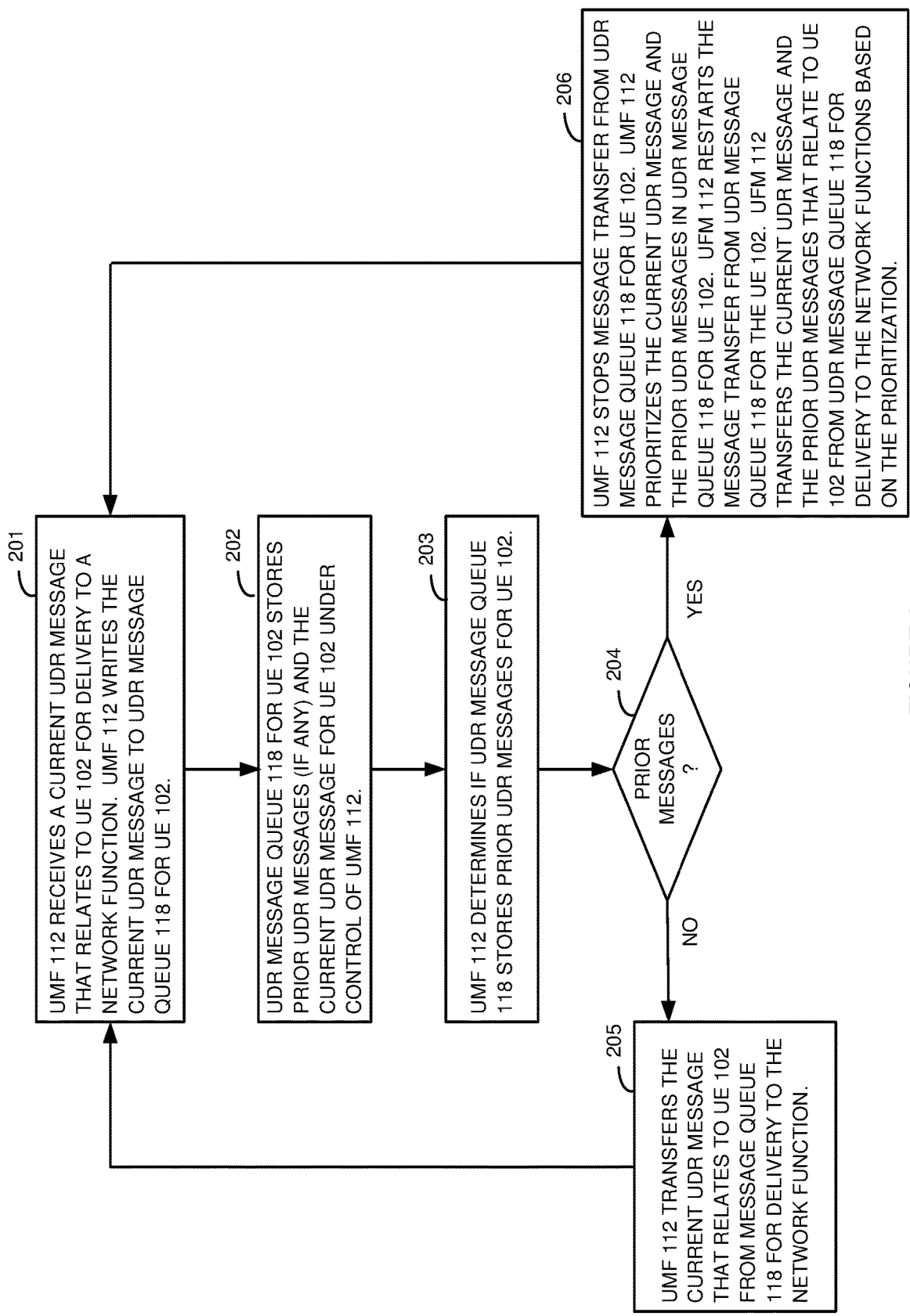
FIG. 2 illustrates an exemplary operation of the wireless communication network to serve the UDR over the UMF.

FIG. 2 illustrates an exemplary operation of wireless communication network 100 to serve UDR 111 over UMF 112. UMF 112 receives a current UDR message that relates to UE 102 for delivery to a network function (201). UMF 112 writes the current UDR message to UDR message queue 118 for UE 102 (201). UDR message queue 118 for UE 102 stores prior UDR messages (if any) and the current UDR message for UE 102 under control of UMF 112 (202). UMF 112 determines if UDR message queue 118 stores any prior UDR messages for UE 102 (203). When UDR message queue 118 does not store any prior UDR messages for UE 102 (204), UMF 112 transfers the current UDR message that relates to UE 102 from message queue 118 for UE 102 for delivery to the network function (205). When UDR message queue 118 does store prior UDR messages for UE 102 (204), UMF 112 stops message transfer from UDR message queue 118 for UE 102. UFM 112 prioritizes the current UDR message and the prior UDR messages in UDR message queue 118 for UE 102. UFM 112 restarts the message transfer from UDR message queue 118 for the UE 102. UFM 112 transfers the current UDR message and the prior UDR messages that relate to UE 102 from UDR message queue 118 for delivery to the network functions based on the prioritization. The operation repeats (201).

Figure 3:
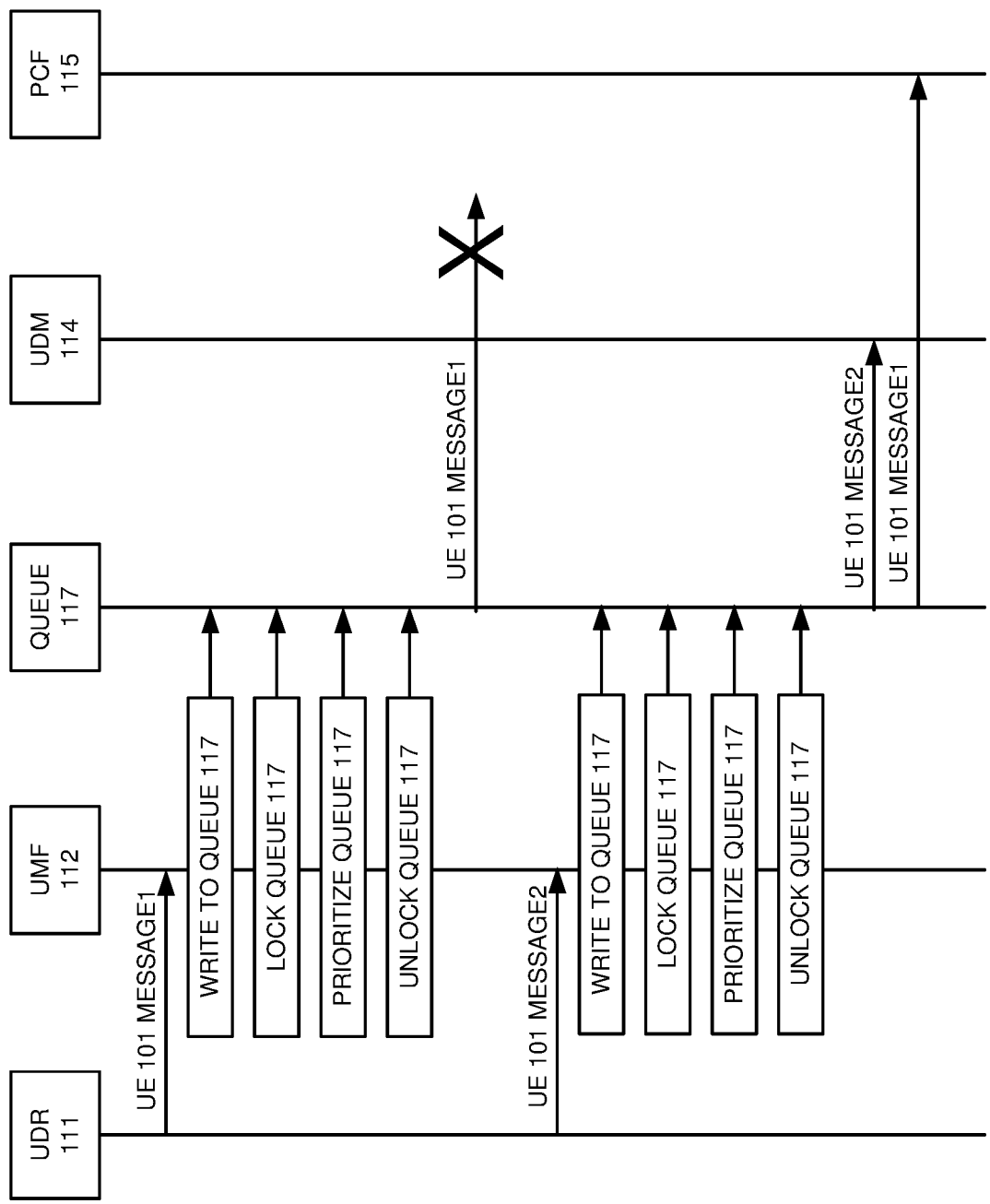
FIG. 3 illustrates an exemplary operation of the wireless communication network to serve the UDR over the UMF.

FIG. 3 illustrates an exemplary operation of wireless communication network 100 to serve UDR 111 over UMF 112. UDR 111 transfers UDR message #1 to UMF 112 that relates to wireless UE 101 and is for delivery to PCF 115. UMF 112 writes the UDR message to UDR message queue 117 for the wireless UE 101. In this example, UFM 112 determines that UDR message queue 117 stores other UDR messages and locks UDR message queue 117 for UE 101. The queue lock stops all message transfers from queue 117. During the lock, UFM 112 prioritizes the UDR messages in UDR message queue 117 based on message age, type, destination, and/or some other factors. UFM 112 then unlocks UDR message queue 117 for UE 101 by restarting message transfer from queue 117 per the prioritization. UFM 112 transfers the UDR messages that relate to wireless UE 101 from UDR message queue 117 for delivery the network functions (including PCF 115) based on the prioritization. UFM 112 uses a protocol to assure UDR message delivery, but the UDR message to PCF 115 is lost, and UFM 112 does not receive a receipt acknowledgement from PCF 115.

Before UDR message #1 is re-transferred from UFM 112, UDR 111 transfers UDR message #2 to UMF 112 that relates to wireless UE 101 and is for delivery to UDM 114. UMF 112 writes the UDR message to UDR message queue 117 for UE 101. UMF 112 determines that UDR message queue 117 stores other UDR messages and locks UDR message queue 117. The queue lock stops all message transfers from queue 117. UFM 112 prioritizes the UDR messages in UDR message queue 117 based on age, type, destination, and/or some other factors. Older messages typically have priority over newer messages. Message types like "stop service" typically have priority over message types like "improve service". Message destinations like UDMs typically have priority over messages destinations like PCF and NEF. In some examples, multiple factors like age, type, and destination are normalized and combined into a priority score for the UDR message. UFM 112 unlocks UDR message queue 117 by restarting message transfer from queue 117 per the prioritization. UDR message #2 now has a higher priority than UDR message #1, so UFM 112 transfers UDR message #2 from UDR message queue 117 for delivery to UDM 113 based on the prioritization. UFM 112 then transfers UDR message #1 from UDR message queue 117 for delivery to PCF 115 based on the prioritization. UMF 112 could handle messages from UDR 111 to NEF 116 in a similar manner.

Figure 4:
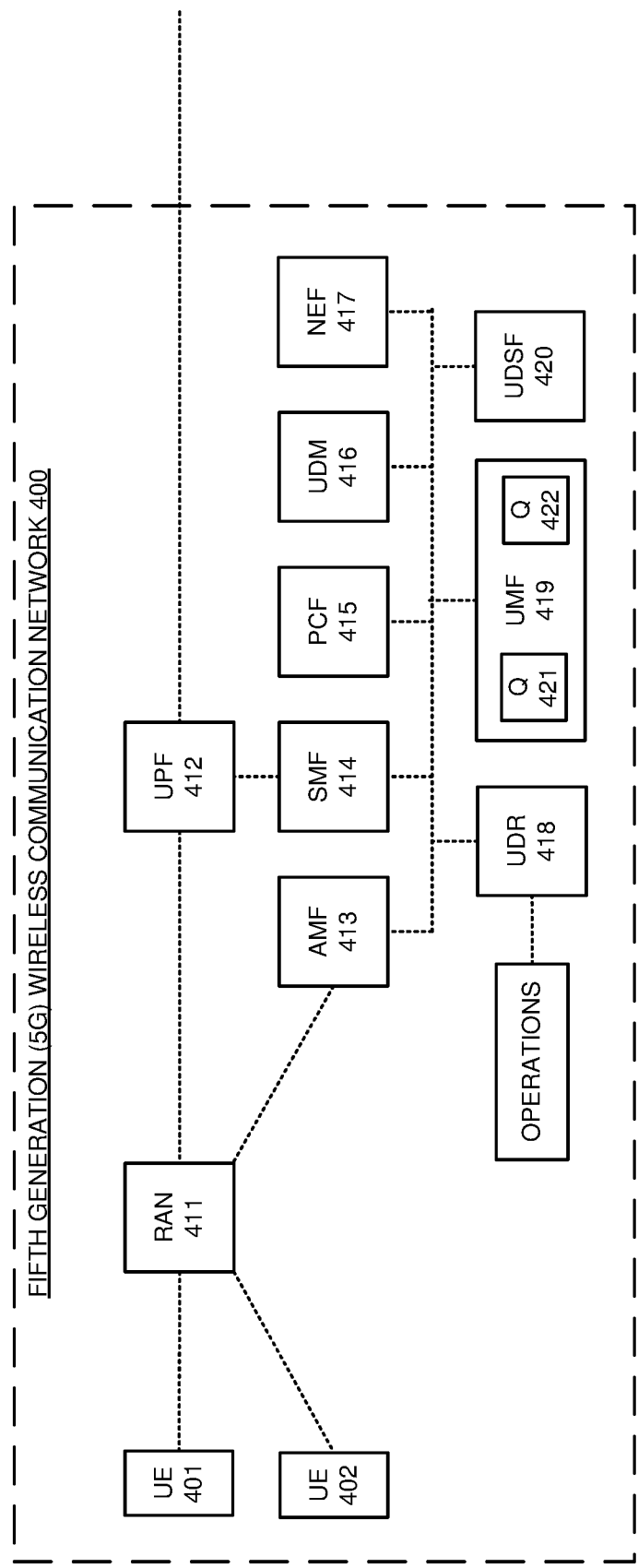
FIG. 4 illustrates a Fifth Generation (5G) wireless communication network to serve a UDR over a UMF.

FIG. 4 illustrates Fifth Generation (5G) wireless communication network 400 to serve UDR 418 over UMF 419. 5G wireless communication network 400 comprises an example of wireless communication network 100, although network 100 may vary from this example. 5G wireless communication network 400 comprises: UEs 401-402, RAN 411, User Plane Function (UPF) 412, Access and Mobility Management Function (AMF) 413, Session Management Function (SMF) 414, Policy Control Function (PCF) 415, Unified Data Management (UDM) 416, Network Exposure Function 417, Unified Data Repository (UDR) 418 UDR Message Function (UMF) 419 and Unstructured Data Storage Function (UDSF) 420. UMF 419 comprises UDR message queue 421 for UE 401 and UDR message queue 422 for UE 402.

UEs 401-402 wirelessly attach to RAN 411 and exchange user data with external systems over RAN 411 and UPF 412. AMF 413 and RAN 111 exchange network signaling to deliver the communications services to UEs 401-402. AMF 413 and RAN 111 exchange network signaling with UEs 401-402 to deliver the communications services. SMF 414 and UPF 412 exchange network signaling to deliver the communications services to UEs 401-402. AMF 413 and SMF 414 exchange network signaling with one or more of PCF 415, UDM 416, NEF 417, UDR 418, UFM 419, and UDSF 420 to deliver the communications services to UEs 401-402. The network signaling that supports the service delivery for UE 401 have a UE identifier for UE 401 like a Subscriber Universal Private Identifier (SUPI), Subscriber Universal Concealed Identifier (SUCI), International Mobile Subscriber Identifier (IMSI), and/or some other user-specific code. The network signaling that supports the service delivery for UE 402 have a UE identifier for UE 402.

Network operations transfers instructions to UDR 418 that affect the service delivery to UEs 401-402, and the instructions have the corresponding UE IDs. For example, network operations may transfer an instruction to UDR 418 to stop service delivery to UE 401 and to improve service quality for UE 402. In response to the instructions, UDR 418 generates and transfers corresponding network signaling messages that identify UE 401-402 to UMF 419 for delivery to one or more of PCF 415, UDM 416, NEF 417, UDR 418, UFM 419, and UDSF 420. For example, UDR 418 may transfer network signaling to UMF 419 for delivery to UDM 416, where the signaling directs UDM 416 to stop service for UE 401. UDR 418 may transfer network signaling to UMF 419 for delivery to PCF 415, where the signaling directs PCF 415 to improve quality for UE 402.

UMF 419 time-stamps the received signaling messages—possibly with a vector clock notation. UMF 419 identifies the UE IDs for UEs 401-402 in the signaling messages. UMF 419 writes the signaling message that relate to UE 401 to message queue 421. UMF 419 writes the signaling message that relate to UE 402 to message queue 422. Message queues 421-422 store the signaling messages. Message queues 421-422 and may store previously received signaling messages that relate to UEs 401-402.

UFM 419 determines if message queue 421 for UE 401 stores other signaling messages. When message queue 121 for UE 401 does not store other signaling messages, UMF 419 transfers the signaling message that relates to UE 401 from message queue 421 for delivery. For example, UMF 419 may transfer the signaling message that relates to UE 401 to UDM 416 to stop service delivery to UE 401. UFM 419 uses Hyper Text Transfer Protocol (HTTP) 2 to assure signaling message delivery by repeating signaling message transmission until a message acknowledgement is received or the signaling message is deleted. The repeat signaling messages are placed in queue 421 and may be prioritized (and possibly deleted) before retransmission.

When message queue 421 for UE 401 stores previously received signaling messages, UMF 419 locks message queue 421 to stop all signaling message transfer from queue 421. UFM 419 prioritizes the signaling messages in message queue 421 based on factors like: age, type, and destination. For example, a stop-service message type may have a higher priority than an improve quality message type. Some signaling messages may be deleted from queue 421 responsive to a very low priority. Factor combinations, rule scripts, and scoring may be used to generate the priorities. UFM 419 then unlocks message queue 421 for UE 401 by restarting signaling message transfer per the prioritization. UFM 419 then transfers the signaling messages that relate to wireless UE 401 from message queue 421 for delivery based on the prioritization. For example, a new stop-service message for UE 401 may be transmitted to UDM 416 before an older service quality message for UE 401 is transmitted to PCF 415—which would likely be deleted for flowing a stop service message. UFM 419 uses HTTP2 to assure signaling message delivery by repeating signaling message transmission until a message acknowledgement is received or the signaling message is deleted during a prioritization lock.

UFM 419 determines if message queue 422 for UE 402 stores other signaling messages. When message queue 422 for UE 402 does not store other signaling messages, UMF 419 transfers the signaling message that relates to UE 402 from message queue 422 for delivery. For example, UMF 419 may transfer the signaling message that relates to UE 402 to PCF 415 to improve service quality for UE 402. UFM 419 uses HTTP 2 to assure signaling message delivery. When message queue 422 for wireless UE 402 stores other signaling messages, UMF 419 locks message queue 422 to stop all signaling transfers from queue 422. UFM 419 prioritizes the signaling messages in message queue 422 for UE 402 based on factors like: age, type, and destination. For example, a signaling message that is destined for a PCF function type (like PCF 415) may have a higher priority than a signaling message that is destined for a UDSF function type like UDSF 420. Some signaling messages may be deleted from queue 422 responsive to a very low priority or rule. UFM 419 then unlocks message queue 422 for UE 402 by restarting signaling message transfer per the prioritization. UFM 419 transfers the signaling messages that relate to wireless UE 402 from message queue 422 for delivery based on the prioritization. For example, an improve-quality message for UE 402 may be transmitted to PCF 415 before a corresponding quality message is transmitted to UDSF 420. UFM 419 uses HTTP2 to assure signaling message delivery. The repeat signaling messages are placed in queue 422 and may be prioritized (and possibly deleted) before retransmission.

Figure 5:
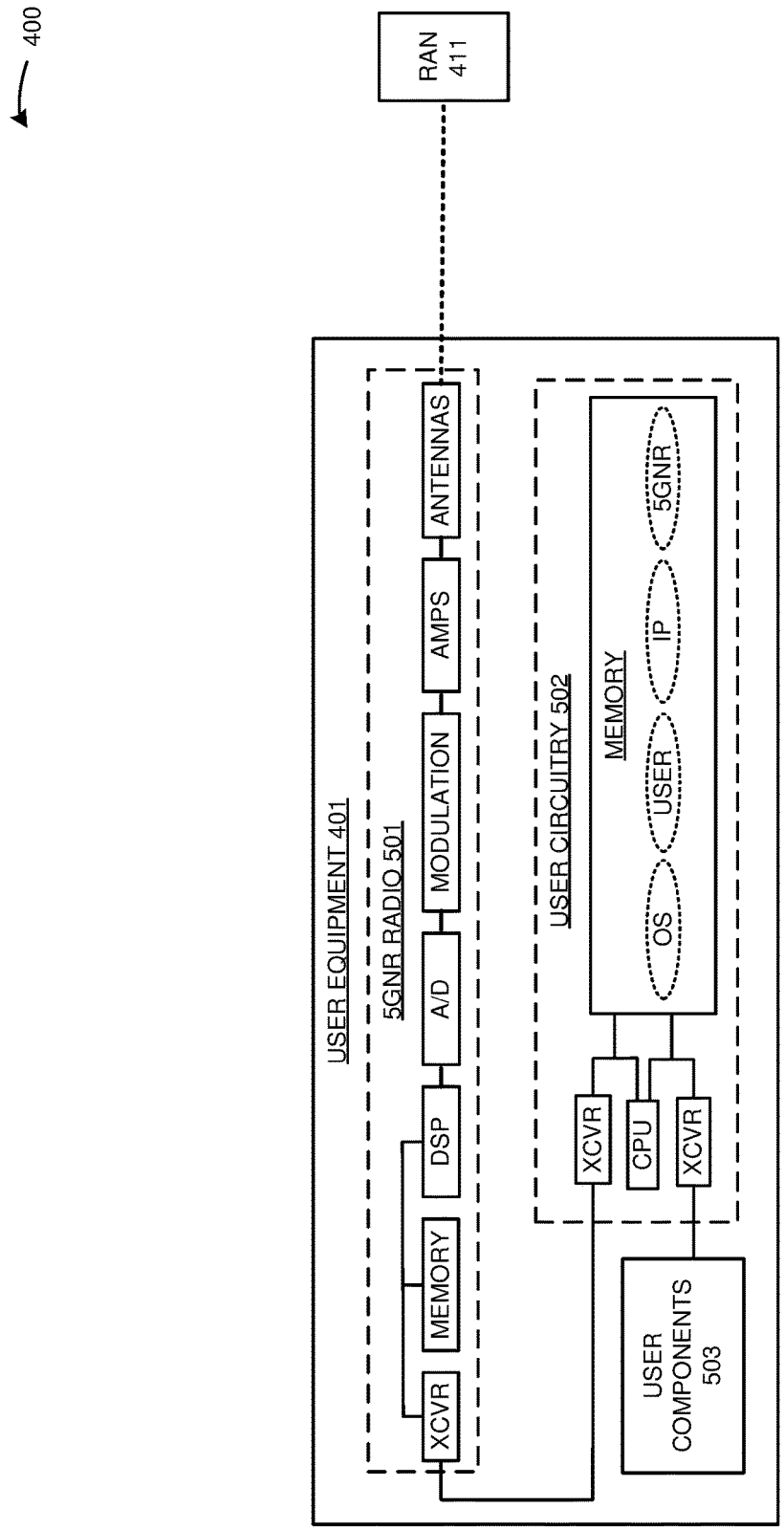
FIG. 5 illustrates a UE in the 5G wireless communication network.

FIG. 5 illustrates UE 401 in 5G wireless communication network 400. UE 401 comprises an example of UEs 101-102, although UEs 101-102 may differ. UE 402 could be similar. UE 401 comprises 5GNR radio 501, user circuitry 502, and user components 503. Radio 501 comprises antennas, amplifiers, filters, modulation, analog-to-digital interfaces, DSP, memory, and transceivers that are coupled over bus circuitry. User circuitry 502 comprises memory, CPU, user interfaces and components, and transceivers that are coupled over bus circuitry. The memory in user circuitry 502 stores an operating system, user applications (USER), and network applications for IP and 5GNR. The 5GNR network applications comprise Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to RAN 411 over a 5GNR link. Transceivers (XCVRs) in 5GNR radio 501 are coupled to transceivers in user circuitry 503. Transceivers in user circuitry 502 are coupled to user components 503 like displays, controllers, interfaces, and memory. The CPU in processing circuitry 502 executes the operating system, user applications, and network applications to exchange network signaling and user data over 5GNR radio 501 with RAN 411.

Figure 6:
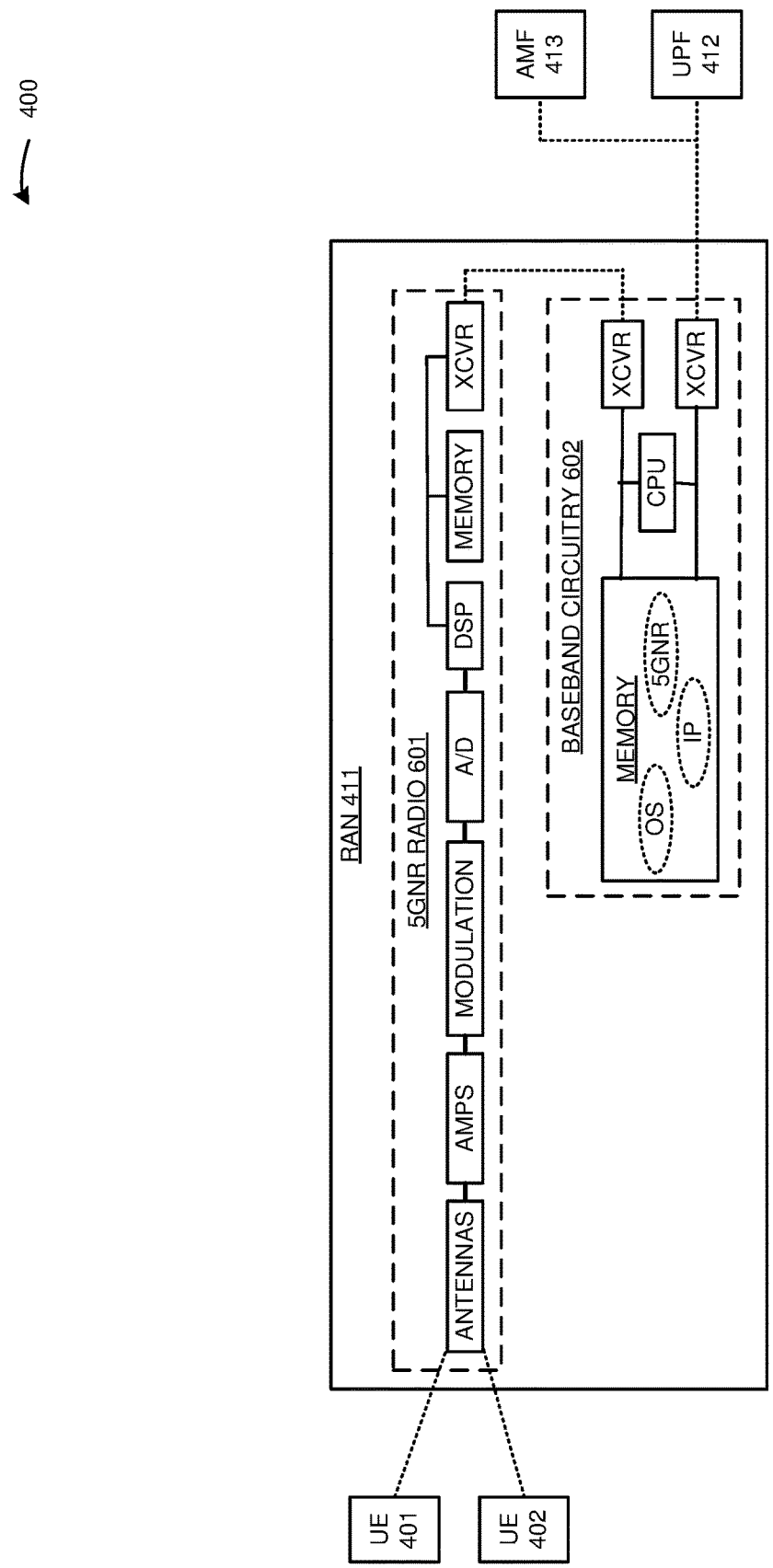
FIG. 6 illustrates a Radio Access Network (RAN) in the 5G wireless communication network.

FIG. 6 illustrates Radio Access Network (RAN) 411 in 5G wireless communication network 400. RAN 411 comprises an example of RAN 111 although RAN 111 may differ. RAN 411 comprises 5GNR radio 601 and baseband circuitry 602. 5GNR WIFI radio 601 comprises antennas, amplifiers, filters, modulation, analog-to-digital interfaces, DSP, memory, and transceivers that are coupled over bus circuitry. Baseband circuitry 602 comprises memory, CPU, user interfaces and components, and transceivers that are coupled over bus circuitry. The memory in baseband circuitry 602 stores an operating system, user applications, and network applications for IP and 5GNR (PHY, MAC, RLC, PDCP, SDAP, and RRC). The antennas in 5GNR radio 601 are wirelessly coupled to UEs 401-402 over 5GNR links. Transceivers (XCVRs) in 5GNR radio 601 are coupled to transceivers in baseband circuitry 602. Transceivers in baseband circuitry 602 are coupled to transceivers in UPF 412 and AMF 413. The CPU in baseband circuitry 602 executes the operating systems, user applications, and network applications to exchange network signaling and user data with UEs 401-402 and with AMF 413 and UPF 412. In particular, the network applications direct UE operations responsive to network signaling.

Figure 7:
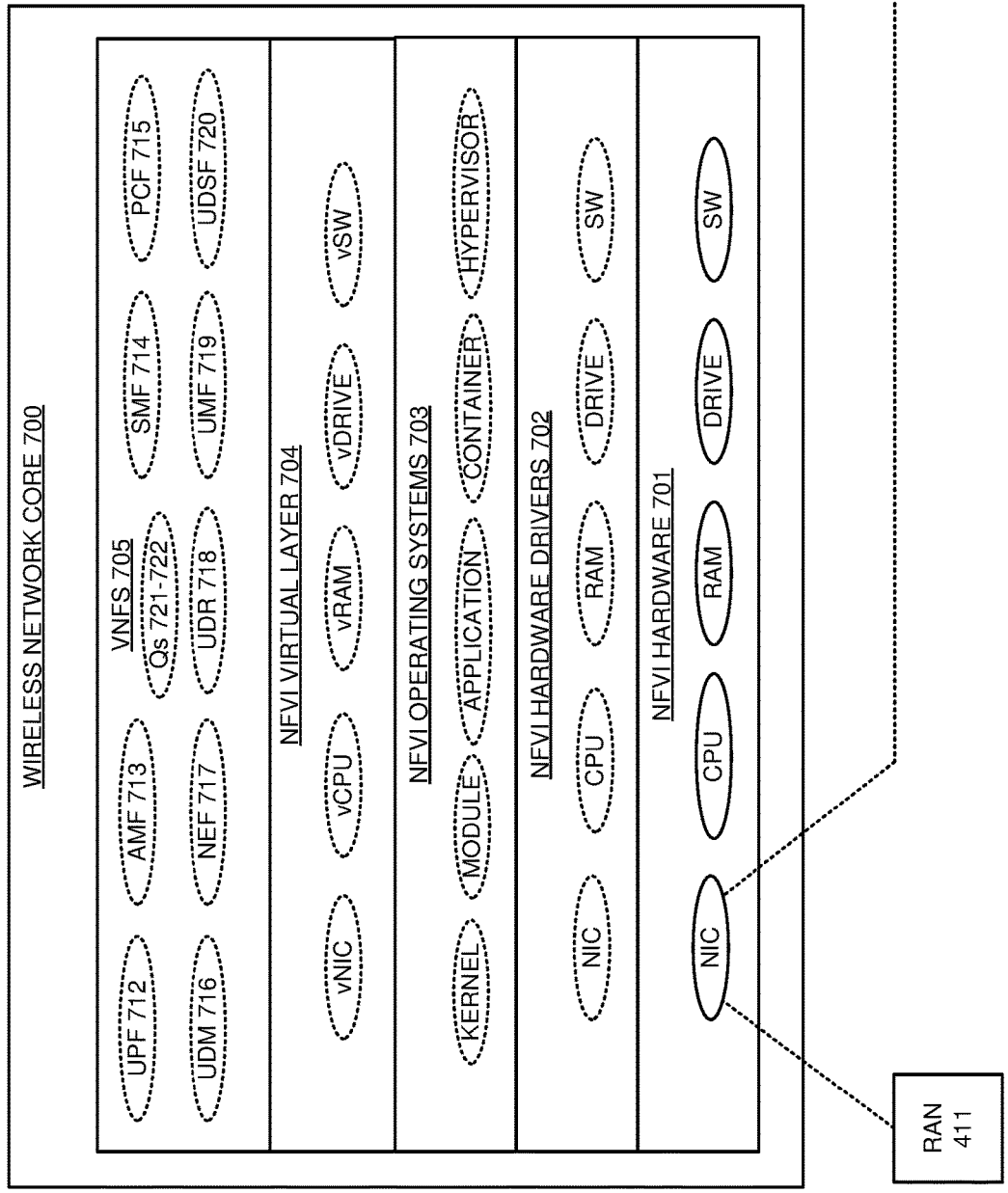
FIG. 7 illustrates a wireless network core in the 5G wireless communication network.

FIG. 7 illustrates wireless network core 700 in 5G wireless communication network 400. Wireless network core 700 comprises an example of wireless communication network 100, although network 100 may differ. Wireless network core 700 comprises Network Function Virtualization Infrastructure (NFVI) hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise UPF 712, AMF 713, SMF 714, PCF 715, UDM 716, NEF 717, UDF 718, UMF 719, UDSF 720, and message queues 721-722. Other VNFs like Authentication Server Function (AUSF) and Network Repository Function (NRF) are typically present but are omitted for clarity. Wireless network core 700 may be located at a single site or be distributed across multiple geographic locations. The NIC in NFVI hardware 701 are coupled to RAN 411 and external systems. NFVI hardware 701 executes NFVI hardware drivers 702, NFVI operating systems 703, NFVI virtual layer 704, and NFVI VNFs 705 to form and operate UPF 412, AMF 413, SMF 414, PCF 415, UDM 416, NEF 417, UDF 418, UMF 419, UDSF 420, and message queues 421-422. UMF VNF 719 may be integrated within UDR VNF 718 or UDSF VNF 720. Message queue VNFs 721-722 may be integrated within UDR VNF 718, UMF VNF 719, or UDSF VNF 720. Message queues 421-422 may be geographically distributed across multiple NFVIs.

Figure 8:
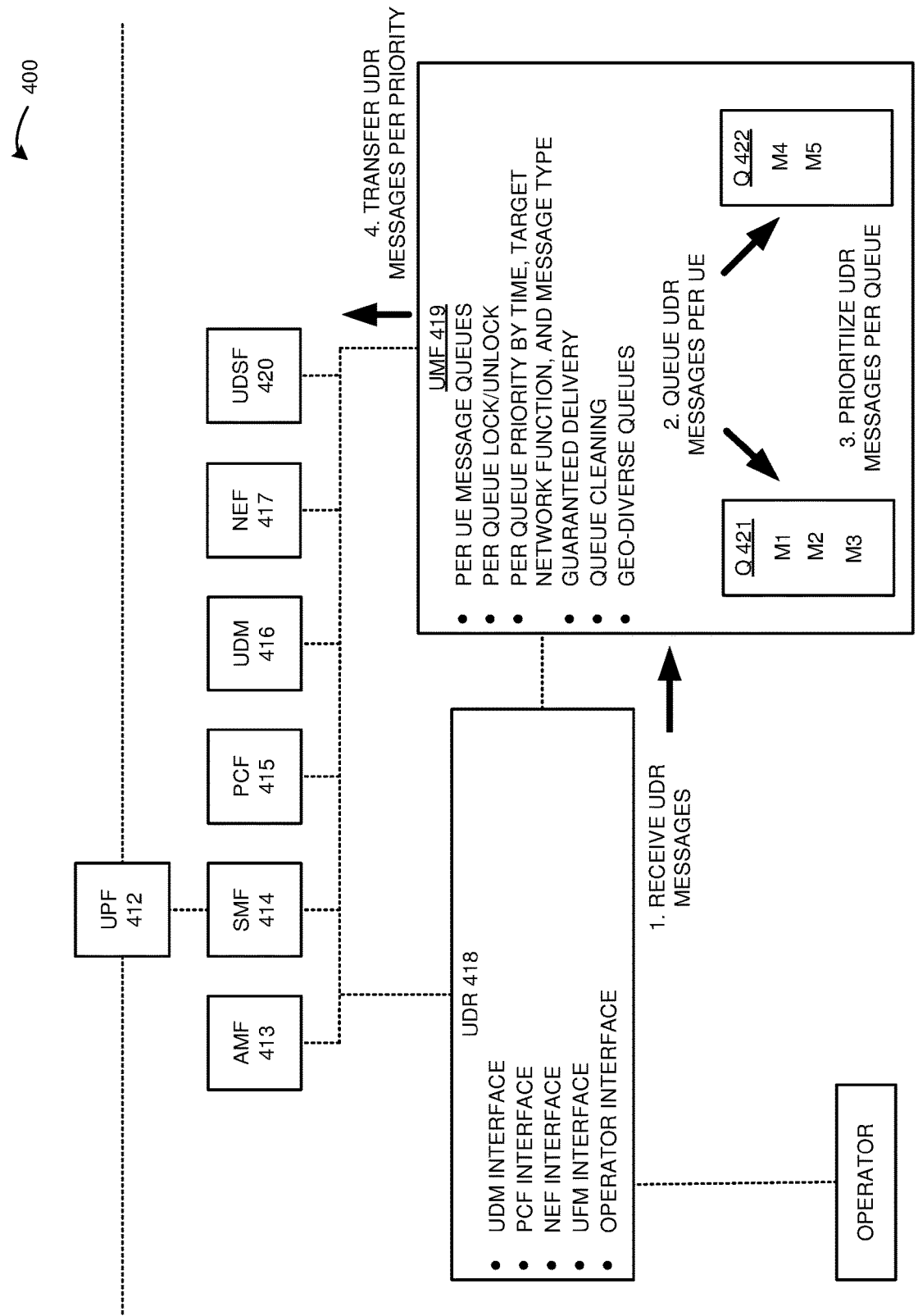
FIG. 8 illustrates an exemplary operation of the 5G wireless communication network to serve the UDR over the UMF.

FIG. 8 illustrates an exemplary operation of 5G wireless communication network 400 to serve UDR 418 over UMF 419. UDR 418 comprises interfaces for operator, UFM, NEF, PCF, and UDM. UMF 419 comprises per-UE message queues and features per-queue lock/unlock, prioritization, cleaning, and geo-diversity. UMF 419 implements delivery assurance for the transferred signaling messages.

UDR 418 receives operator instructions over an operator interface to stop service, start service, improve service, restrict service, report events, and the like. Based on the operator instructions, UDR 418 generates and transfers signaling messages to UMF 419 for delivery to AMF 413, SMF 414, PCF 415, UDM 416, NEF 417, UDSF 418, or some other destination. UMF 419 writes the individual signaling messages to individual queues for the individual UEs that are identified in the signaling messages. For example, UMF 419 writes individual signaling messages M1, M2, and M3 to queue 421 because they that identify UE 401. UMF 419 writes individual signaling messages M4 and M5 to queue 422 because they that identify UE 402. After writing a signaling message to queue 421 or 422, UFM 419 determines if the message queue stores other signaling messages. When the message queue does not store other signaling messages, UMF 419 transfers the signaling message from the queue for delivery to AMF 413, SMF 414, PCF 415, UDM 416, NEF 417, UDSF 418, or some other destination. UMF 419 uses HTTP2 or another communication protocol to assure signaling message delivery.

In this example, queue 421 stores messages M1 and M2 when message M3 is stored. Since message queue 421 stores other signaling messages, UMF 419 locks message queue 421 to stop signaling transfer from queue 421. UFM 419 prioritizes signaling messages M1, M2, and M3 in message queue 421 based on factors like: age, type, and destination. For example, the age priority (M1, M2, M3) may be re-prioritized based on message type to a new priority (M2, M1, M3). Some priorities may result in immediate deletion or abandonment of a message. UMF 419 then unlocks message queue 421 to restart signaling message transfer per the prioritization. UFM 419 then transfers the signaling messages that relate to wireless UE 401 from message queue 421 for delivery based on the prioritization. UFM 419 uses HTTP2 to assure signaling message delivery.

In this example, queue 422 stores message M4 when message M5 is stored. Since message queue 422 multiple signaling messages, UMF 419 locks message queue 422 to stop signaling message transfer from queue 422. UFM 419 prioritizes signaling messages M4 and M5 in message queue 421 based on factors like: age, type, and destination. For example, the age priority (M4, M5) may be re-prioritized based on message destination to a new priority (M5, M4). Some priorities may result in immediate deletion or abandonment of a message. UMF 419 then unlocks message queue 422 to restart signaling message transfer per the prioritization. UFM 419 then transfers the signaling messages that relate to wireless UE 402 from message queue 422 for delivery based on the prioritization. UFM 419 uses HTTP2 to assure signaling message delivery.

The wireless data network circuitry described above comprises computer hardware and software that form special-purpose networking circuitry to serve UDRs over UMFs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UDRs over UMFs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a Unified Data Repository (UDR), the method comprising:
   a UDR Message Function (UMF) receiving a current UDR message that relates to a wireless User Equipment (UE) for delivery to a network function, writing the current UDR message to a UDR message queue for the wireless UE, and determining if the UDR message queue stores one or more prior UDR messages that relate to the wireless UE;
   the UMF transferring the current UDR message that relates to the wireless UE from the message queue for the wireless UE for delivery to the network function when the UDR message queue for the wireless UE does not store the one or more prior UDR messages for the wireless UE;
   when the UDR message queue for the wireless UE does store the one or more prior UDR messages for the wireless UE, the UMF stopping message transfer from the UDR message queue for the wireless UE, prioritizing the current UDR message and the one or more prior UDR messages in the UDR message queue for the wireless UE, restarting the message transfer from the UDR message queue for the wireless UE, and transferring the current UDR message and the one or more prior UDR messages that relate to the wireless UE from the UDR message queue for the wireless UE for delivery to the network function and to other network functions if any based on the prioritization, wherein prioritizing the current UDR message and the one or more prior UDR messages comprises prioritizing ones of the current UDR message and the one or more prior UDR messages that comprise a specific message type over other ones of the current UDR message and the one or more prior UDR messages that comprise another message type; and
   the UDR message queue for the wireless UE storing the one or more prior UDR messages if any and storing the current UDR message for the wireless UE under control of the UMF.

2. The method of claim 1 wherein the network function comprises a Policy Control Function (PCF).

3. The method of claim 1 wherein the network function comprises a Unified Data Management (UDM).

4. The method of claim 1 wherein the network function comprises a Network Exposure Function (NEF).

5. The method of claim 1 wherein the UDR message queue for the wireless UE storing the one or more prior UDR messages comprises storing the one or more prior UDR messages at geographically-diverse physical locations.

6. The method of claim 1 wherein the UMF and the UDR message queue comprise at least one Virtual Network Function (VNF) in a Network Function Virtualization Infrastructure (NFVI).

7. The method of claim 1 further comprising the UMF time-stamping the one or more prior UDR messages and the current UDR message and wherein prioritizing the current UDR message and the one or more prior UDR messages comprises prioritizing older ones of the current UDR message and the one or more prior UDR messages over newer ones of the current UDR message and the one or more prior UDR messages.

8. The method of claim 1 wherein prioritizing the current UDR message and the one or more prior UDR messages comprises prioritizing ones of the current UDR message and the one or more prior UDR messages that are for delivery to a specific network function type over other ones of the current UDR message and the one or more prior UDR messages that are for delivery to another network function type.

9. The method of claim 1 wherein transferring the current UDR message and the one or more prior UDR messages that relate to the wireless UE from the UDR message queue for the wireless UE for delivery to the network function and to the other network functions if any comprises transferring at least one of the current UDR message and the one or more prior UDR messages multiple times to assure delivery.

10. A wireless communication network to serve a Unified Data Repository (UDR), the wireless communication network comprising:
   a UDR Message Function (UMF) configured to receive a current UDR message that relates to a wireless User Equipment (UE) for delivery to a network function, write the current UDR message to a UDR message queue for the wireless UE, determine when the UDR message queue stores one or more prior UDR messages that relate to the wireless UE, transfer the current UDR message that relates to the wireless UE from the message queue for the wireless UE for delivery to the network function when the UDR message queue for the wireless UE does not store the one or more prior UDR messages for the wireless UE, and when the UDR message queue for the wireless UE does store the one or more prior UDR messages for the wireless UE, the UMF configured to stop message transfer from the UDR message queue for the wireless UE, prioritize the current UDR message and the one or more prior UDR messages in the UDR message queue for the wireless UE, restart the message transfer from the UDR message queue for the wireless UE, and transfer the current UDR message and the one or more prior UDR messages that relate to the wireless UE from the UDR message queue for the wireless UE for delivery to the network function and to other network functions if any based on the prioritization, wherein the UFM is configured to prioritize ones of the current UDR message and the one or more prior UDR messages that comprise a specific message type over other ones of the current UDR message and the one or more prior UDR messages that comprise another message type; and the UDR message queue for the wireless UE configured to store the one or more prior UDR messages if any and storing the current UDR message for the wireless UE under control of the UMF.

11. The wireless communication network of claim 10 wherein the network function comprises a Policy Control Function (PCF).

12. The wireless communication network of claim 10 wherein the network function comprises a Unified Data Management (UDM).

13. The wireless communication network of claim 10 wherein the network function comprises a Network Exposure Function (NEF).

14. The wireless communication network of claim 10 wherein the UDR message queue for the wireless UE is configured to store the one or more prior UDR messages at geographically-diverse physical locations.

15. The wireless communication network of claim 10 wherein the UMF and the UDR message queue comprise at least one Virtual Network Function (VNF) in a Network Function Virtualization Infrastructure (NFVI).

16. The wireless communication network of claim 10 further comprising the UMF configured to time-stamp the one or more prior UDR messages and the current UDR message and to prioritize older ones of the current UDR message and the one or more prior UDR messages over newer ones of the current UDR message and the one or more prior UDR messages.

17. The wireless communication network of claim 10 wherein the UFM is configured to prioritize ones of the current UDR message and the one or more prior UDR messages that are for delivery to a specific network function type over other ones of the current UDR message and the one or more prior UDR messages that are for delivery to another network function type.

18. The wireless communication network of claim 10 wherein the UFM is configured to transfer at least one of the current UDR message and the one or more prior UDR messages multiple times to assure delivery.

19. The method of claim 1 wherein the specific message type comprises a stop-service message type.

20. The wireless communication network of claim 10 wherein the specific message type comprises a stop-service message type.

\* \* \* \* \*